United States Patent Office 3,398,102
Patented Aug. 20, 1968

3,398,102
TACKY, CURABLE POLYMERS OF BIS(2,3-EPOXY-CYCLOPENTYL)ETHER AND A POLYOL AND A PROCESS FOR THE PREPARATION THEREOF
Anthony C. Soldatos, Kendall Park, and Allison S. Burhans, Millington, N.J., assignors to Union Carbide Corporation, a corporation of New York
No Drawing. Filed July 5, 1966, Ser. No. 562,468
17 Claims. (Cl. 260—2)

ABSTRACT OF THE DISCLOSURE

This invention relates to tacky, curable polymers of a polyol and bis(2,3-epoxycyclopentyl)-ether and to a process for the preparation thereof by reacting a polyol with bis(2,3-epoxycyclopentyl)-ether in the presence of a tertiary amine. The polymers of this invention can be formed into structures of desired shape and can be used as binders in laminates and in filament wound structures.

---

This invention relates to curable, tacky epoxide polymers, to compositions based thereon and to a process for the preparation of these polymers by the reaction of bis-(2,3-epoxycyclopentyl)ether with a polyol. More particularly, this invention relates to curable, tacky epoxide polymers and to cured products obtained therefrom which are characterized by excellent compressive modulus (ASTMD–695–61) generally in excess of about 1,000,000 p.s.i., by excellent compressive yield strength (ASTMD–695–61) generally in excess of about 37,000 p.s.i. and by excellent heat distortion temperatures as high as about 188° C.

The cured products of this invention, by virtue of their excellent properties, as described, are extremely versatile in their field of application. For example, by reason of their excellent heat distortion temperatures, shaped structures of the cured products of this invention can be used as component parts of high speed aircraft as they do not undergo undesirable dimensional changes when being subjected to relatively high temperatures.

Also, the cured products of this invention, by reason of their excellent compressive properties are highly attractive for use as binders in filament wound, deep sea submergence vehicles and in structural laminates which are to be subjected to high compressive forces. The cured products of this invention successfully resist undesirable deformation and undergo no undesirable loss of strength when subjected to such high compressive forces.

The curable, tacky polymers of this invention, in addition to being cured to thermoset products characterized by excellent properties, are ideally suited for impregnating glass filaments and the like which are to be used in the production of filament wound structures in general. The tacky nature of these polymers allows them to tenaciously adhere to the filaments to which they have been applied.

The curable, tacky polymers of this invention are prepared by polymerizing bis(2,3 - epoxycyclopentyl)ether with a polyol in the presence of a tertiary amine.

Illustrative of polyols, including mixtures thereof, which can be polymerized with bis(2,3-epoxycyclopentyl) ether in the presence of a tertiary amine to produce the curable tacky polymers of this invention are the trihydric compounds such as glycerine and the like, the tetrahydric compounds such as pentaerythritol and the like and the dihydric glycols such as those having the formula:

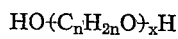

wherein $n$ has a value of 2 to 20 inclusive, preferably 2 to 6 inclusive and $x$ has a value of 1 to 70 inclusive, preferably 1 to 10 inclusive. Among suitable glycols can be noted ethylene glycol, diethylene glycol, 1,2-propanediol, 1,4 - butanediol, 1,10 - decanediol, 2,2 - bis(bromoethyl)propane-1,3-diol, poly(ethylene glycol), poly(1,2-propanediol) and the like. Also suitable are the commercially available glycols marketed under the name "Carbowax" such as poly(ethyleneglycol) and poly(propylene glycol) which have an average molecular weight of about 300 to about 700.

Other suitable polyols are the sucrose based polyols marketed under the trade name "Sutro" as well as the polyols marketed under the name "NIAX Polyols" which are poly(propyleneglycol) or mixed poly(propylene glycol)-poly(ethylene glycol) polymers having molecular weights of about 700 to about 6000.

As previously stated, the curable, tacky polymers of this invention are prepared by polymerizing bis(2,3-epoxycyclopentyl)ether with a polyol or mixtures thereof in the presence of a tertiary amine. Among suitable tertiary amines are those having the formula:

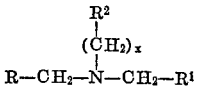

wherein $x$ is an integer having a value of 0 to 1 inclusive and R, $R^1$ and $R^2$, which can be the same or different are hydrogen or monovalent hydrocarbon radicals, particularly monovalent hydrocarbon radicals which are free of olefinic and acetylenic unsaturation and have a maximum of 12 carbon atoms, as for example, methyl, ethyl, isopropyl, n-butyl, n-amyl, n-hexyl, 2-ethyl-n-hexyl, n-heptyl, n-octyl, n-nonyl, n-dodecyl, benzyl, 2-phenylethyl, 3-phenyl-n-heptyl, phenyl, o-methylphenyl, o-n-butylphenyl and the like. Specific compounds include, among others, trimethylamine, tri-n-propylamine, tri - n - dodecylamine, tri - n - docosylamine, tri(2-phenylethyl)amine, tribenzylamine, dimethyl - n - propylamine, methylethyl-n-propylamine, N,N-dimethylaniline, benzyl dimethylamine and the like.

As a general rule, the temperature at which the polymerization reaction is conducted can vary over a wide range from about 0° C. to about 250° C. A particularly preferred temperature range is about 70° C. to about 130° C.

The polymerization reaction can be conducted under atmospheric, subatmospheric or superatmospheric pressures.

In addition, organic solvents, such as benzene, toluene and the like can be used when necessary in order to fluidize the reaction mixture.

Recovery of the curable, tacky polymer from the reacted mixture can be conveniently accomplished by removing unreacted polyol, epoxide and tertiary amine by vacuum distillation at a temperature up to about 150° C.

The amount of polyol employed in conducting the polymerization reaction is at least about 0.1 mole per mole of epoxide, generally about 0.2 to about 3 moles and preferably about 0.5 to about 1.5 moles per mole of epoxide.

The tertiary amine is used in at least a catalytic amount, that is, in an amount sufficient to initiate the polymerization reaction, generally in an amount of at least about 0.05 percent by weight based on the weight of the epoxide, preferably about 0.1 percent by weight to about 20 percent by weight and more preferably about 1 percent by weight to about 4 percent by weight based on the weight of the epoxide.

As previously stated, the curable, tacky polymers of this invention are particularly suitable for use as binders in the production of structural and filament wound structures. In preparing such binders, the desired polymer is admixed with an aromatic amine and the resultant composition dissolved in a suitable organic solvent to form a solution having a solids content of about 30 to about 70 percent by weight. As a rule, the organic solvent used is a ketone, such as methyl ethyl ketone, diisopropyl ketone or an aromatic hydrocarbon, such as toluene and the like. This solution is then used to impregnate, by any suitable method, for example, dipping, spraying and the like, any desired material, for instance, glass cloth, glass filaments, boron filaments, carbon cloth, carbon filaments, nylon filaments, metal fibers, paper and the like. The solvent is removed from the impregnated material and the impregnated material is stored on a spool and subsequently formed into a desired shape and the composition cured to its infusible state.

The temperature to which each impregnated material is heated in order to effect a cure of the composition will, of course, vary and depend, in part, upon the exact formulation of the composition. As a rule, this temperature is in the range of about 80° C. to about 200° C. for a period of time ranging from about 1 to 20 hours. In the production of laminates, it is also customary to subject the impregnated material to elevated pressures.

The aromatic amines which are admixed with the polymers of this invention are those aromatic amines which contain at least two primary amino groups per molecule wherein the amino groups, which can be on the same or different aromatic nuclei, are attached directly to an aromatic nucleus, which is generally a phenyl radical, through the nitrogen atom of the amino group.

Illustrative of suitable aromatic amines are those having the formula:

Formula I 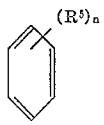

wherein each $R^5$, which can be the same or different, is halogen, e.g., chlorine, bromine and the like; primary amino groups; or hydrocarbon radicals, generally containing 1 to 20 carbon atoms inclusive and preferably containing 1 to 10 carbon atoms inclusive and $n$ is a whole number having a value of 2 to 6 inclusive; provided that at least two of the $R^5$'s are primary amino groups.

Illustrative of hydrocarbon radicals for $R^5$ are alkyl radicals, generally containing 1 to 20 carbon atoms inclusive and preferably containing 1 to 10 carbon atoms inclusive, such as methyl, ethyl, n-propyl, isopropyl, n-butyl, n-decyl and the like; cycloalkyl radicals, generally containing 3 to 20 carbon atoms inclusive and preferably containing 3 to 10 carbon atoms inclusive, such as cyclohexyl and the like; unsaturated alicyclic and unsaturated aliphatic hydrocarbon radicals, generally containing from 2 to 20 carbon atoms inclusive, such as cyclopentenyl, allyl and the like; halogenated alkyl and cycloalkyl radicals, generally containing 1 to 20 carbon atoms inclusive and preferably containing 1 to 10 carbon atoms inclusive, such as chloroethyl, bromoethyl, fluoroethyl, 2-chloro-n-propyl, 2-bromo-n-propyl, 2-chloro-n-butyl and the like; alkoxy and aryloxy substituted alkyl and cycloalkyl radicals, generally containing 2 to 20 carbon atoms inclusive and preferably containing 2 to 10 carbon atoms inclusive, such as methoxymethyl, ethoxyethyl, 3-ethoxy-n-propyl, 4-ethoxy-n-butyl, 2-methoxycyclohexyl, phenoxymethyl, 2-phenoxymethyl and the like; aryl radicals, generally containing 6 to 20 carbon atoms inclusive and preferably containing 6 to 18 carbon atoms inclusive, such as phenyl, tolyl and the like, as well as halogenated aryl radicals, such as p-chlorophenyl, p-bromophenyl, p-fluorophenyl, p-iodophenyl and the like; alkoxy and aryloxy substituted aryl radicals, generally containing 7 to 20 carbon atoms inclusive and preferably containing 9 to 18 carbon atoms inclusive, such as p-methoxyphenyl, p-ethoxyphenyl, p-n-propoxyphenyl and the like; alkaryl radicals, such as o-methylphenyl, p-ethylphenyl, p-n-propylphenyl, o-n-propylphenyl and the like; also those hydrocarbon radicals, as described, which are substituted with one or more amino groups.

Exemplary of such aromatic amines are the following: o-phenylenediamine, p-phenylenediamine, m-phenylenediamine, benzidine, o-toluidine, o-dianisidine and the like.

Particularly desirable aromatic amines falling within the scope of Formula I are those amines having the formula:

Formula II 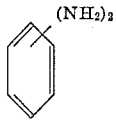

Among other suitable aromatic amines are those having the formula:

Formula III 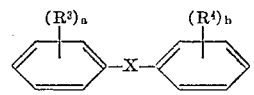

wherein $R^3$ and $R^4$ are as defined for $R^5$, $a$ and $b$ are whole numbers having a value of 1 to 5 inclusive and X is a divalent radical, as for example,

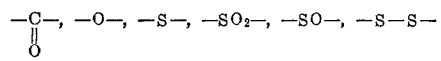

or a divalent hydrocarbon radical, wherein the amine contains at least two primary amino groups per molecule, as described, and these do not necessarily have to be attached to the same aromatic nucleus.

Illustrative of suitable divalent hydrocarbon radicals for X are the following divalent, aliphatic hydrocarbon radicals; alkylene radicals, generally containing 1 to 6 carbon atoms inclusive and preferably containing 1 to 4 carbon atoms inclusive, such as methylene, ethylene, trimethylene and the like; alkylidene radicals, generally containing 2 to 6 carbon atoms inclusive and preferably containing 2 to 4 carbon atoms inclusive, such as ethylidene, propylidene, isopropylidene and the like.

Particularly desirable aromatic amines falling within the scope of Formula III are those aromatic amines having the formula:

Formula IV 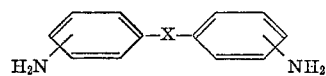

wherein X is sulfone ($SO_2$) or a divalent hydrocarbon radical, as previously defined.

Specific aromatic amines falling within the scope of Formula III are the following: 4,4'-diaminodiphenylmethane, 4,4'-diaminodiphenylsulfone, bis(4-amino-2-chlorophenyl)methane and the like. Also suitable for purposes of this invention are the aromatic amines produced on reacting aniline with formaldehyde.

As a general rule, the amine is used in amounts of about 70 percent of stoichiometric to about 30 percent in excess of stoichiometric. For purposes of stoichiometric calculations, one epoxy group is deemed to react with one amino hydrogen atom.

It is to be understood that mixtures of aromatic amines can be used if so desired. It is also to be understood that the polymers of this invention can be cured with conventional epoxide hardeners such as phthalic anhydride and other such anhydrides.

Also, the disclosure of all patents and literature references noted in this application are incorporated herein by reference.

The following examples further illustrate the present invention.

Example 1

Into a five-liter flask, equipped with an agitator, reflux condenser and thermometer, there was charged 2090 grams (11 moles) of bis(2,3-epoxycyclopentyl)ether, 341 grams (5.5 moles) of ethylene glycol and 81.5 grams of N,N-dimethylbenzylamine (3.9 percent by weight based on the weight of bis(2,3-epoxycyclopentyl)ether). The reaction mixture was maintained at a temperature of 120° C. for six hours and then distilled to a pot temperature of 145° C. under a pressure of 7 mm. Hg.

The curable, tacky polymer recovered had an epoxide equivalent weight of 133.1 grams/gram mole.

Example 2

In a like manner as described in Example 1, using the same equivalent amounts, a curable, tacky polymer was prepared from bis(2,3-epoxycyclopentyl)ether and a sucrose based polyol having a hydroxy number, mg.KOH/gram, of about 375. After being recovered in a manner as described in Example 1, the polymer was water-washed 3 times with 1200 ml. portions of water.

Epoxide equivalent weight=157.0 grams/gram mole
Heat distortion temperature=183° C. (cured with a stoichiometric amount of m-phenylenediamine in a manner described in Example 4).

Example 3

In a like manner as described in Example 1, using the same equivalent amounts, a curable, tacky polymer was prepared from bis(2,3 - epoxycyclopentyl)ether and a homopolymer of 9-oxatetracyclo $4.4.1^{2,5}0^{1,6}0^{8,10}$-undecan-4 ol. This homopolymer has the formula:

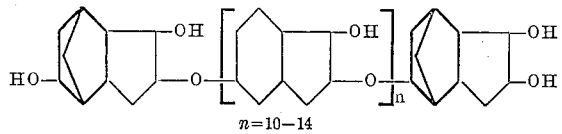

$n=10-14$

Epoxide equivalent weight=211.0 grams/gram mole

Example 4

In a like manner as described in Example 1, using the same equivalent amounts, a curable, tacky polymer was prepared from bis(2,3-epoxycyclopentyl)ether and 2,2-bis(bromomethyl)propane-1,3-diol.
Epoxide equivalent weight=199.0 grams/gram mole Example 5

Castings, in the form of cylinders, were prepared by admixing 325 grams of the polymer of Example 1 with a stoichiometric amount (65.9 grams) of m-phenylenediamine, casting each composition into cylindrical test tubes and heating the test tubes according to the following schedule:

1 hour at 85° C.
3 hours at 120° C.
16 hours at 160° C.

The castings were removed from the test tubes and subjected to the tests noted below:

Compressive modulus=1,020,000 p.s.i.
Compressive yield strength=37,886 p.s.i.

What is claimed is:
1. Process for the preparation of a tacky, curable polymer which comprises polymerizing an aliphatic polyol with bis(2,3-epoxycyclopentyl)ether in the presence of a catalytic amount of a tertiary amine having the formula:

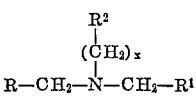

wherein $x$ has a value of 0 to 1 and R through $R^2$ are selected from the group consisting of hydrogen and monovalent hydrocarbon radicals having a maximum of 22 carbon atoms, for a period of time sufficient to produce said polymer.

2. Process as defined in claim 1 wherein the polyol has the formula $HO(C_nH_{2n}O)_xH$ wherein $n$ has a value of 2 to 20 inclusive and $x$ has a value of 1 to 70 inclusive and is used in amounts of at least about 0.1 mole per mole of bis(2,3-epoxycyclopentyl)ether.

3. Process as defined in claim 1 wherein the polyol is used in amounts of about 0.2 mole to about 3 moles per mole of bis(2,3-epoxycyclopentyl)ether.

4. Process as defined in claim 1 wherein the polyol is used in amounts of about 0.5 mole to about 1.5 moles per mole of bis(2,3-epoxycyclopentyl)ether.

5. Process as defined in claim 2 wherein said tertiary amine is used in amounts of at least about 0.05 percent by weight based on the weight of bis(2,3-epoxycyclopentyl)ether.

6. Process as defined in claim 2 wherein said tertiary amine is used in amounts of about 0.1 percent to about 20 percent by weight based on the weight of bis(2,3-epoxycyclopentyl)ether.

7. Process as defined in claim 2 wherein said tertiary amine is used in amounts of about 1 percent by weight to about 4 percent by weight based on the weight of bis-(2,3-epoxycyclopentyl)ether.

8. Process as defined in claim 1 wherein the polymerization reaction is conducted at a temperature of about 0° C. to about 250° C.

9. Process as defined in claim 1 wherein the glycol is ethylene glycol.

10. Process as defined in claim 1 wherein the tertiary amine is N,N-dimethylbenzylamine.

11. A tacky, curable polymer of a composition consisting essentially of an aliphatic polyol and bis(2,3-epoxycyclopentyl)ether and a tertiary amine having the formula defined in claim 1.

12. A tacky, curable polymer as defined in claim 11 wherein the polyol is ethylene glycol.

13. A tacky, curable polymer as defined in claim 11 wherein the polyol is a sucrose based polyol.

14. A tacky, curable polymer as defined in claim 11 wherein the polyol is 2,2-bis(bromomethyl)propane-1,3-diol.

15. A curable composition comprising the polymer of claim 11 and an aromatic amine having at least two primary amino groups per molecule.

16. A curable composition comprising the polymer of claim 11 and an aromatic amine having the formula:

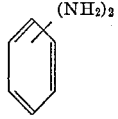

17. A tacky, curable polymer as defined in claim 11 wherein the polyol has the formula:

$HO(C_nH_{2n}O)_xH$ wherein $n$ has a value of 2 to 20 inclusive and $x$ has a value of 1 to 70 inclusive.

References Cited

UNITED STATES PATENTS

| | | | |
|---|---|---|---|
| 3,018,258 | 1/1962 | Meier et al. | 260—47 |
| 3,063,949 | 11/1962 | Phillips et al. | 260—2 |
| 3,182,099 | 5/1965 | Clark et al. | 260—2 |
| 3,012,979 | 12/1961 | Stephens et al. | 260—47 |

OTHER REFERENCES

Epoxy Resins, Skeist 9-1958 (pp. 21–23 relied on).

WILLIAM H. SHORT, *Primary Examiner.*
T. PERTILLA, *Assistant Examiner.*